United States Patent
Bona et al.

(10) Patent No.: US 10,105,661 B2
(45) Date of Patent: Oct. 23, 2018

(54) CARBONATION TOWER FOR BEVERAGE DISPENSING APPARATUS

(71) Applicant: Whirlpool S.A., Sao Paulo (BR)

(72) Inventors: Gustavo Lazzaris De Bona, Joinville (BR); Alisson Costa Da Silva, Joinville (BR)

(73) Assignee: Whirlpool S.A., Sao Paulo (BR)

( * ) Notice: Subject to any disclaimer, the term of this patent is extended or adjusted under 35 U.S.C. 154(b) by 119 days.

(21) Appl. No.: 15/324,311

(22) PCT Filed: Jul. 24, 2015

(86) PCT No.: PCT/BR2015/050102
§ 371 (c)(1),
(2) Date: Jan. 6, 2017

(87) PCT Pub. No.: WO2016/015120
PCT Pub. Date: Feb. 4, 2016

(65) Prior Publication Data
US 2017/0203264 A1    Jul. 20, 2017

(30) Foreign Application Priority Data

Jul. 28, 2014   (BR) .......................... 1020140184597

(51) Int. Cl.
*B01F 3/04* (2006.01)
*B01F 15/06* (2006.01)
*B01F 5/04* (2006.01)
*B67D 1/00* (2006.01)

(52) U.S. Cl.
CPC ........ *B01F 3/04808* (2013.01); *B01F 5/0483* (2013.01); *B01F 15/065* (2013.01); *B67D 1/0067* (2013.01); *B01F 2003/049* (2013.01); *B01F 2015/061* (2013.01); *B01F 2215/0022* (2013.01)

(58) Field of Classification Search
CPC .. B01F 3/04808; B01F 5/0483; B01F 15/065; B01F 2003/049; B01F 2015/061; B01F 2215/0022; B67D 1/0067
USPC .......................... 261/140.1, 29, 36.1, DIG. 7
See application file for complete search history.

(56) References Cited

U.S. PATENT DOCUMENTS

| | | | |
|---|---|---|---|
| 2,586,499 A | 2/1952 | Anderson | 261/11 |
| 3,137,326 A | 6/1964 | Welty et al. | 141/18 |
| 3,312,083 A | 4/1967 | Scoggins et al. | 62/390 |

(Continued)

*Primary Examiner* — Charles S Bushey
(74) *Attorney, Agent, or Firm* — Harrington & Smith

(57) ABSTRACT

A carbonation tower for containers of household appliances, more specifically for appliances for the automatic preparation of instant drinks, which has been developed to provide more optimized operation and use and efficient than those achieved with the known similar. Said carbonation tower including a substantially elongated body included of at least one pipe provided with at least two holes and said pipe secured to a base including at least a nozzle, said cooperating base further including a lid of a lower compartment; said lid further including at least one toroidal contoured rib cooperating with at least one lower nozzle of the container, and wherein the water and the carbon dioxide are sucked by the upper edge of the pipe and/or the holes and expelled in a path orthogonal to the suction axis through the at least one nozzle.

4 Claims, 4 Drawing Sheets

(56) References Cited

U.S. PATENT DOCUMENTS

| | | | | |
|---|---|---|---|---|
| 4,923,644 A | * | 5/1990 | Kuckens | B01F 3/04808 |
| | | | | 261/155 |
| 5,370,283 A | | 12/1994 | Nelson et al. | 222/464 |
| 5,443,763 A | * | 8/1995 | Notar | B01F 3/04808 |
| | | | | 261/140.1 |
| 5,464,124 A | * | 11/1995 | Weyh | B01F 3/04787 |
| | | | | 222/129.1 |
| 5,474,717 A | * | 12/1995 | Bucher | B01F 3/04808 |
| | | | | 261/140.1 |
| 6,182,949 B1 | * | 2/2001 | Mobbs | B01F 3/04531 |
| | | | | 261/119.1 |
| 6,830,239 B1 | | 12/2004 | Weber et al. | 261/121.1 |
| 7,422,684 B1 | * | 9/2008 | Davis | C02F 1/78 |
| | | | | 210/192 |
| 2003/0071376 A1 | * | 4/2003 | Bellas | B01F 3/0473 |
| | | | | 261/115 |

* cited by examiner

CARBONATION TOWER FOR BEVERAGE DISPENSING APPARATUS

FIELD OF THE INVENTION

The present invention relates to a carbonation tower for reservoirs of household appliances, more specifically for apparatuses for the automatic preparation of instant drinks, which has been developed to provide a more optimized and efficient operation and use than those achieved with similar known ones.

BACKGROUND OF THE INVENTION

As is well known, the range of equipment that allows users to instantly prepare products for immediate consumption has been growing over the last few years, and among the equipment in such a niche market are those destined for the preparation of carbonated beverages, whose fundamental principle of operation is based on the use of capsules that store various beverage inputs or flavoring inputs and which at the time of preparation have their contents removed and mixed with carbonated water stored in a reservoir located therein.

Those skilled in the art know that to carbonate the water it is necessary to have carbon dioxide ($CO_2$) in contact with water. Accordingly, the carbonation towers currently employed in home appliances for the preparation of instant drinks basically comprise a cylindrical body disposed in the central region of a reservoir containing the water to be gassed, said body having upper nozzle in contact with the source of carbon dioxide, and the lower portion of the pipe contains a single hole for water entry which will be premixed to the $CO_2$ collected by its upper nozzle. Said carbonation tower is attached to the water reservoir with the aid of screws and is further provided with a circulation pump which releases the water+$CO_2$ mixture from the interior of the carbonation tower into the reservoir, more specifically the region in which the system serpentine is located.

However, this type of known carbonation tower has some drawbacks that end up interfering with the efficiency of the system as a whole, one of which concerns the existence of only a bottom hole to collect the water. It should be clarified that although such a hole is arranged in such a way as to allow the abstraction of water even when the reservoir has a small volume of the liquid inside it, the capture of the $CO_2$ gas is constantly made only by the upper nozzle, therefore there is no optimization of the water consumption in the reservoir.

In addition, the fact that the known carbonation tower only performs water uptake in its lower region also does not stimulate the circulation of all stored water so that when the reservoir is full, the water remaining in the upper region ends up not to be properly carbonated since the $CO_2$ bubbles leaving the lower region of the pipe tend to remain concentrated only at the bottom of the tank due to the suction of water promoted by the lower holes of the tower so that in case a user has to dispense several cups (I) will compute a significant time interval between the release followed by the various beverage cups and yet (ii) the quality of the beverage from the last cups will be less than that of the first cup dispensed for consumption.

It is also noted that the known carbonation tower requires the use of a recirculation pump in addition to the main pump used to feed the system, which in turn results in high costs of components used and appliance assembly time.

OBJECTIVES OF THE INVENTION

Accordingly, in view of the drawbacks, the present invention aims to overcome, in particular, the technical problem of the impossibility of dispensing carbonated beverage dispensing apparatus known in the art to consecutively dispense several carbonated beverage cups of the desired minimum quality, that is to say, with uniform quality standards for all cups.

It is yet another object of the present invention to disclose a carbonation tower for reservoirs of beverage dispensing apparatus which provides greater efficiency and uniformity of carbonation for the entire volume of fluid contained in the reservoir.

It is yet another of the objects of the present invention to provide a carbonation tower which is more practical and efficient to the site of use.

Yet another of the objects of the present invention is to provide means for the proper carbonation of the water of a beverage dispensing apparatus which does not require the use of a specific pump for recirculating water into the reservoir and that, moreover, still be able to promote the adequate internal circulation of the aerated fluid to uniformize the characteristics of any beverage to be dispensed, regardless of the amount of cups that is requested simultaneously by the users.

SUMMARY OF THE INVENTION

The above-mentioned objects are achieved by an improvement introduced into a carbonation tower for beverage dispensing apparatus more specifically for carbonated instant beverage preparation and dispensing apparatus comprising at least one cooperating reservoir with at least one evaporator and with cooling coils, in which the reservoir also cooperates with at least one carbonation tower and with a carbon dioxide/$CO_2$ power source.

In a preferred embodiment of the invention, said carbonation tower comprises a substantially elongate body comprised of at least one all provided with at least two holes, said pipe being secured to a base comprising at least one nozzle, said base Cooperating with a lid of a lower compartment; Said cap being further comprising at least one toroidal contoured rib cooperating with at least one lower nozzle of the reservoir, wherein the water and the carbon dioxide/$CO_2$ are sucked by the upper edge of the pipe and/or the orifices and expelled in orthogonal trajectory To the suction shaft through the at least one nozzle.

Also in a preferred embodiment, the at least one cylindrical whole of the carbonation tower comprises at least two height levels containing water inlet orifices, such holes also comprising holes for capturing $CO_2$ when the reservoir water level is low.

Preferably, said lower compartment comprises at least one cooperating electric motor with at least one propeller which acts as a centrifuge to suck $CO_2$ and water from the interior of the cylindrical pipe and to dispense the water+$CO_2$ mixture into the reservoir by means of at least one nozzle.

BRIEF DESCRIPTION OF DRAWINGS

The present invention will be described in detail on the basis of the attached figures, in which.

DETAILED DESCRIPTION OF THE INVENTION

Figure 1:
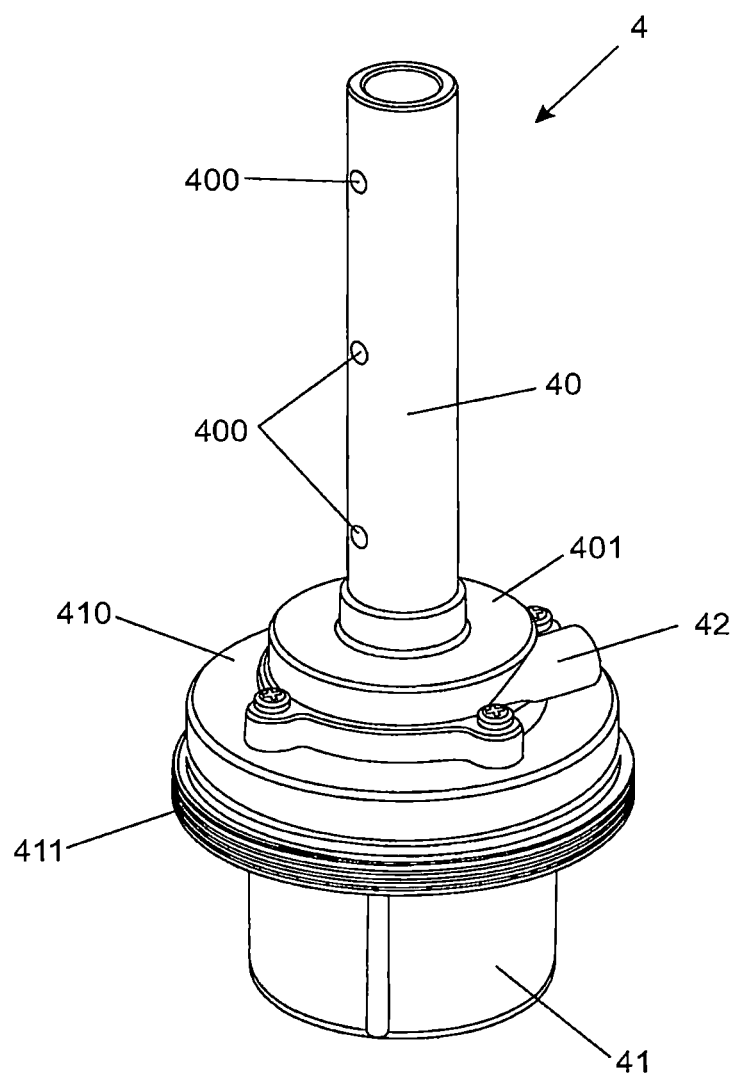
FIG. 1 shows a perspective view of a preferred embodiment of the embodiment introduced into a carbonation tower for beverage dispensing apparatus of the present invention.
Figure 2:
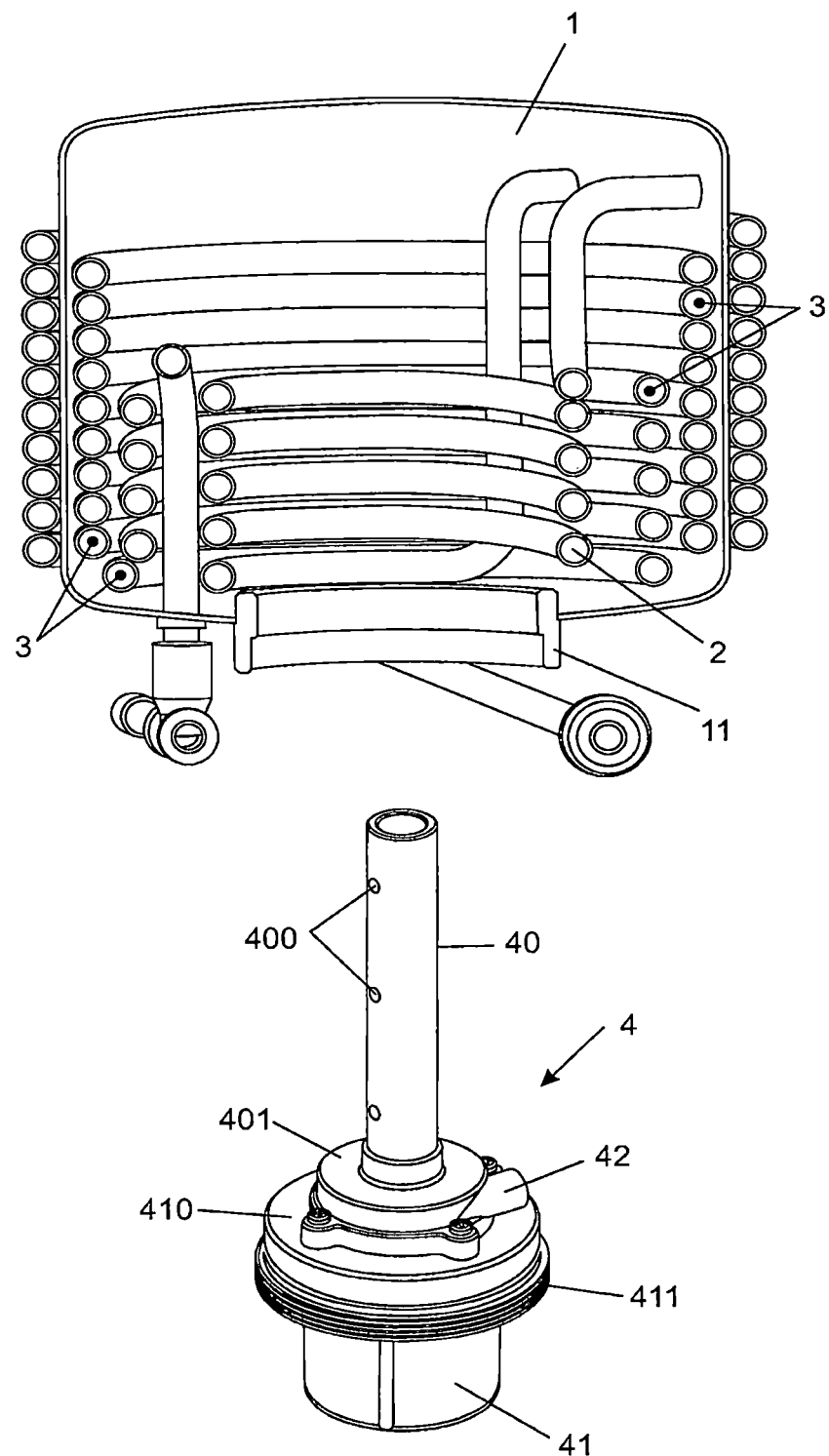
FIG. 2 shows an exploded perspective view of a reservoir with which the carbonation tower shown in FIG. 1 cooperates.
Figure 3:
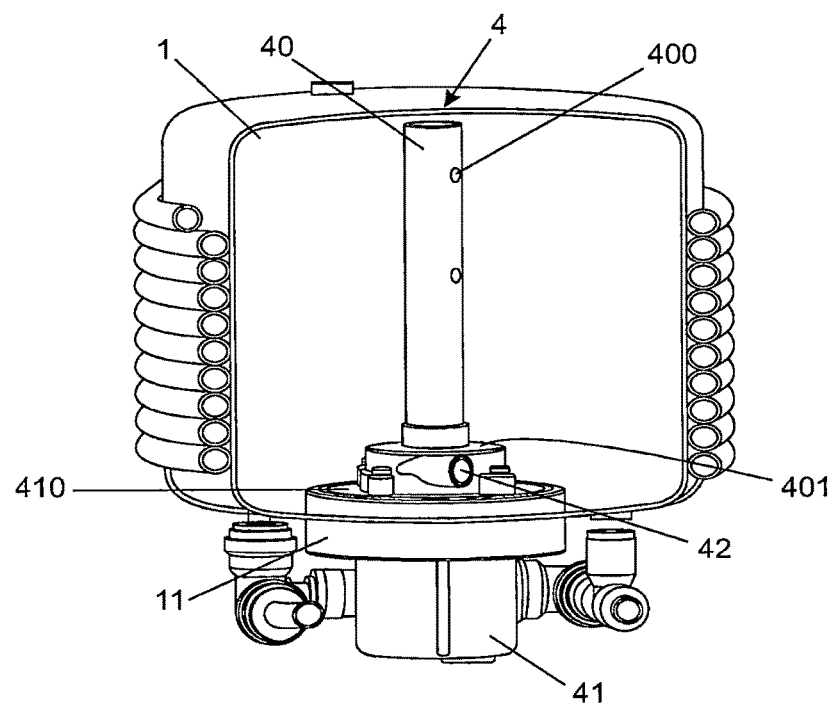
FIG. 3 shows a partial cross-sectional view of a reservoir cooperating with the carbonation tower of FIG. 1.
Figure 4:
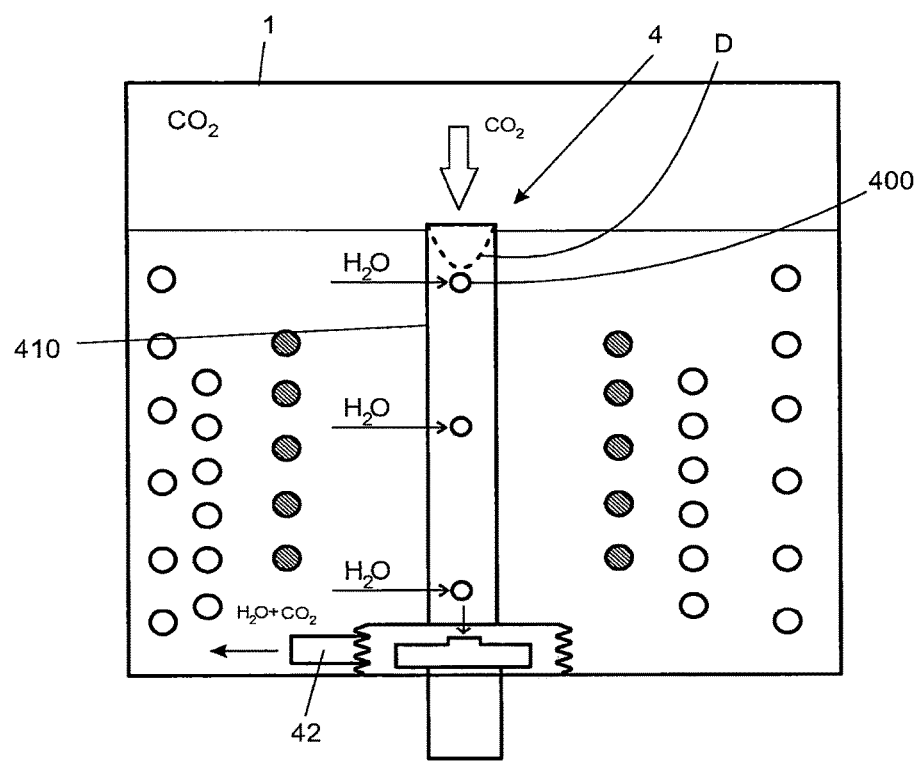
FIG. 4 shows a schematic representation of a section of the object for clarifying the understanding of the path of carbon dioxide in the process of carbonating the water by means of the present invention.

The object of the present invention will become more fully described and explained on the basis of the accompanying drawings, which are of a merely exemplary and non-limiting character, since adaptations and modifications may be made without thereby departing from the protection scope of the invention.

The present invention relates to an improved embodiment of a carbonation tower for beverage dispensing apparatus, more particularly for carbonated instant beverage preparation and dispensing apparatus comprising a reservoir 1 with an evaporator 2 and with cooling coils 3, the reservoir 1 also cooperating with a carbonation tower 4 comprised of a substantially elongate body defined by a cylindrical pipe 40 provided with orifices 400, said cylindrical pipe 40 being integral with a substantially planar base 401 which cooperates with the cap 410 of the lower compartment 41 which stores therein a cooperating electric motor with a propeller which acts as a centrifuge to suck $CO_2$ and water from the interior of the cylindrical pipe 40 and to dispense the water+$CO_2$ mixture into the reservoir 1 by means of said nozzle 42. Further said cap 410 further comprises, on its side perimeter wall, a portion provided with toroidal contouring rib 411 which forms a thread for coupling the carbonation tower 4 to the lower nozzle 11 of the reservoir 1.

As already mentioned, it is necessary to have carbon dioxide ($CO_2$) in contact with water to carbonate the water and with the improvement of the present invention this is done through an electric motor arranged inside the lower compartment 41 which cooperates with a propeller. Thus, the motor assembly sucks the water inside the cylindrical pipe 40 and consequently also promotes suction of the external water through the orifices 400, so that this suction force eventually creates a depression D on the surface of the water contained in the pipe Thus stimulating the simultaneous suction of the carbon dioxide $CO_2$ contained in the upper region of the reservoir 1. Thus, there is suction of water and $CO_2$ by the center of the carbonation tower 4 and the water+$CO_2$ mixture is expelled from it by its region lower side, more specifically by the nozzle 42.

It is important to note that while the current art carbonation tower exists only one water inlet located in the lower region thereof, the cylindrical all 40 of the carbonation tower 4 of the present invention has at least two and preferably three levels containing orifices 400 of water inlet, preferably located in the upper, central and lower regions thereof. With this new construction, water is drawn at all levels of the reservoir, including the region closest to the maximum level of water that may be contained in the reservoir 1—thus stimulating the natural and automatic circulation of the water+$CO_2$ mixture by the entire path between the nozzle 42 and the upper orifice 400 thus optimizing the dissolution of the $CO_2$ in the water and the uniformization of the carbonation.

Another advantage of the improvement disclosed herein is that because of the efficiency of carbonation throughout the volume of water contained in the reservoir 1, it is no longer necessary for the system to consider waiting time for the dispensing of several beverage cups simultaneously, since the interior of the reservoir will be maintained full time with uniformly carbonated water so that the dispensing can be done successively and with all beverage cups being dispensed with the same quality, i.e. with the same degree of carbonation.

In addition, as the dispensing of beverages occurs and the level of water inside the reservoir 1 decreases, the orifices 400 fail to pick up water to alternatively capture more $CO_2$, which further enhances the efficiency of the process. Similarly, as the water in the reservoir 1 is being replenished, it is simultaneously being sucked through the various holes 400 of the cylindrical pipe 40 and thus is automatically and evenly carbonated—unlike the known carbonation towers in the present state of the technique.

It is to be noted that the holes 400 are intended to promote an adequate mass balance in the carbonation tower 4, since it is precisely the suction of the water entering the cylindrical pipe 40 by said holes 400 which allows the suction of the $CO_2$ to occur as best as possible. In addition, it was this modification in the suction system that allowed to use a simple electric motor to make the carbonation of the water—that in the known similar ones demanded the use of an additional rotor.

Another great advantage of the improvement proposed here relates to the ease of mounting the carbonation tower 4 to the reservoir 1, formerly made by means of screws or other fastening elements and is now made by means of threadable coupling by the toroidal contouring rib 411.

The construction proposed in the present invention has also allowed to modify the geometric characteristics of the reservoir, which may have a diameter greater than its height, thus allowing the pipes of the various layers of coil 3 as well as the evaporator 2 can be positioned inside the reservoir 1 at a location furthest from the nozzle 42, thus providing greater freedom so that the water+$CO_2$ mixture released by the nozzle 42 can move without close barriers and thereby standardize the carbonation of the water.

It should be noted that the preferred embodiments shown in the attached figures are only exemplary and not limiting, since the cylindrical all 40 of the carbonation tower 4 may contain more than three levels with holes 400, and the reservoir 1 may have as many layers of coil 3 and/or evaporator 2 as necessary, without thereby departing from the scope of protection herein intended.

Therefore, in a totally new and effective way, the object of the present invention solves the drawbacks of the present state of the art in the optimization of the operations of carbonation of water in reservoirs of apparatuses that prepare and dispense instant drinks, mainly carbonated.

The invention claimed is:

1. Improvement introduced in carbonation tower for appliances beverage dispenser, more specifically for preparing and delivering appliances of carbonated instant drinks comprising at least one container cooperating with at least one evaporator and with cooling coils, wherein the container also cooperates with at least one carbonation tower and a power supply of carbon dioxide/$CO_2$, characterized in that said carbonation tower comprises:

a substantially elongated body comprised of at least one pipe provided with at least two holes and said pipe secured to a base comprising at least one nozzle, said base further comprising a lid of a lower compartment;

said lid further comprising at least one toroidal contoured rib cooperating with at least one lower nozzle of the container, wherein the water and carbon dioxide/$CO_2$ are sucked by the upper edge of the pipe and/or the holes and expelled in a path orthogonal to the suction axis through the at least one nozzle.

2. Improvement according to claim 1, characterized by the fact that all the at least one cylinder pipe of the carbonation tower comprises at least two height levels containing holes water inlet.

3. Improvement according to claim 1, characterized by the fact that the orifices also comprise holes for $CO_2$ captation when the container water level is low.

4. Improvement according to claim 1, characterized by the fact that said lower compartment comprises at least one electric engine cooperating with at least one propeller which acts as a centrifuge to suck $CO_2$ and water from the interior of the cylindrical pipe and dispensing the water+$CO_2$ mixture into the container by means of the at least one nozzle.

* * * * *